United States Patent [19]

Cang et al.

[11] Patent Number: 5,048,183
[45] Date of Patent: Sep. 17, 1991

[54] METHOD OF MAKING AND REPAIRING TURBINE BLADES

[75] Inventors: John N. Cang, San Diego; Joseph R. Gast, Alpine; John J. Hensley; Christian M. Waldhelm, both of San Diego, all of Calif.

[73] Assignee: Solar Turbines Incorporated, San Diego, Calif.

[21] Appl. No.: 609,033

[22] Filed: Nov. 8, 1990

Related U.S. Application Data

[60] Continuation of Ser. No. 377,495, Jul. 10, 1989, abandoned, which is a division of Ser. No. 236,874, Aug. 26, 1988, abandoned.

[51] Int. Cl.$^5$ ................................................ B21K 3/04
[52] U.S. Cl. ................................... 29/889.1; 29/889.7;
29/889.72; 29/402.07; 29/402.13; 228/119;
228/232; 427/34
[58] Field of Search ............... 29/889.1, 889.7, 889.72,
29/402.07, 402.13, 402.14, 527.2, 527.4;
228/119, 232; 427/34, 423, 372.2, 383.1;
415/173.1, 173.4, 174.4; 416/278

[56] References Cited

U.S. PATENT DOCUMENTS

| | | | |
|---|---|---|---|
| 4,128,929 | 12/1978 | DeMusis | 29/889.1 |
| 4,291,488 | 9/1981 | Cretella et al. | 29/889.1 |
| 4,611,744 | 9/1986 | Fraser et al. | 29/889.1 |
| 4,726,104 | 2/1988 | Foster et al. | 29/889.1 |
| 4,808,055 | 2/1989 | Wertz et al. | 29/889.1 |
| 4,822,248 | 4/1989 | Wertz et al. | 29/889.1 |
| 4,866,828 | 9/1989 | Fraser | 29/889.1 |

Primary Examiner—Irene Cuda
Attorney, Agent, or Firm—Larry G. Cain

[57] ABSTRACT

The turbine blade tip clearance control system presently used with existing turbine blade uses an abradable seal material with a conventional squealer tip. Others use a thin, coating added to the tip of the blade. The present turbine blade tip control system minimizes the problem of controlling the clearance between the blade and the shroud and overcomes the problem of wearing away of the thin coating added to the tip by using a rub tolerant, high-temperature seal material coating on a turbine shroud and a turbine blade made of at least two materials. The combination of the coating and an outer tip being of a different material than the metallic body also minimizes the problems associated with the burning of dirty fuels. The blade has a metallic body of high strength and the outer tip has a strength less than the strength of the body and made of a material resistant to oxidation, sulfidation and thermal fatigue at operating temperatures. The outer tip has a radial length "L" at least 1 mm in length.

17 Claims, 2 Drawing Sheets

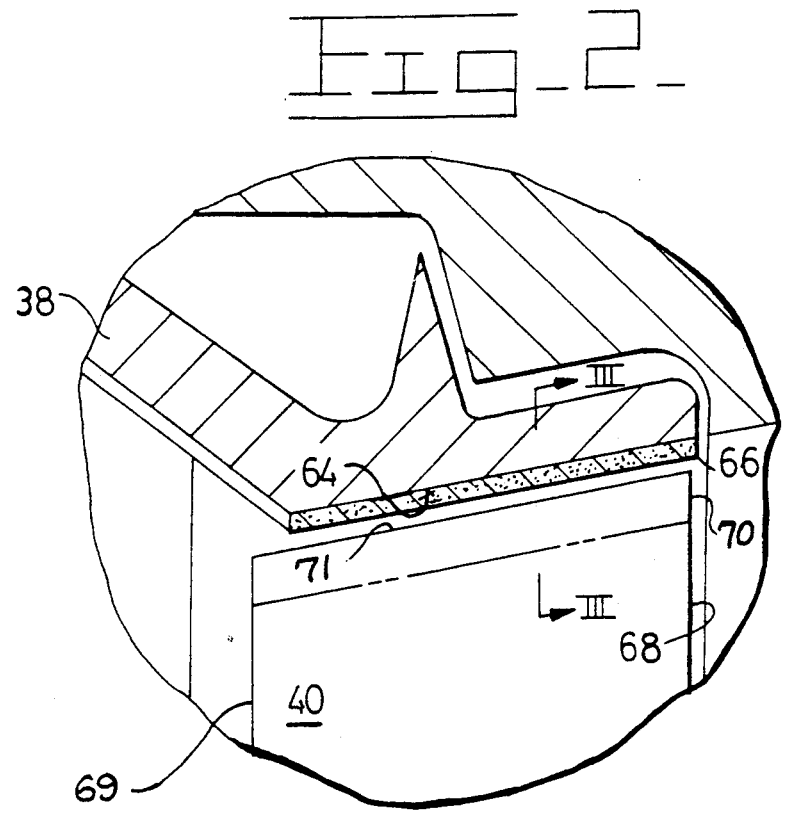
FIG_2_
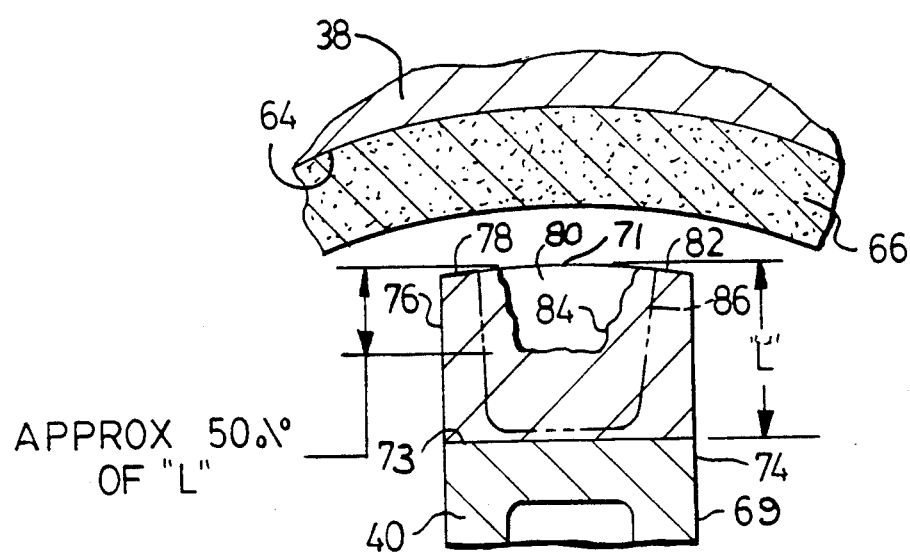
APPROX 50% OF "L"
FIG_3_

METHOD OF MAKING AND REPAIRING TURBINE BLADES

This is a continuation of application No. 07/377,495, filed July 10, 1989 now abandoned, which is a division of application No. 07/236,874 filed Aug. 26, 1988 now abandoned.

DESCRIPTION

1. Technical Field

This invention relates generally to gas turbine engine blade tip clearance control and more particularly to improvements for increasing the turbine blade and shroud assembly resistance to high temperature, oxidation, corrosion and sulfidation.

2. Background Art

Gas turbine engines and other turbomachines have rows of wheel mounted blades which rotate within a generally cylindrical case or shroud. Such engines are generally driven by directing high temperature gas therethrough to cause the blades to rotate relative to the shroud. The gas is generally corrosive in nature due to the chemical makeup thereof. The blades may be coated with a thin protective coating to protect them from the corrosive action of the gas. The purpose of the shroud is to prevent gas from bypassing the blades. Without the shroud, the gas could flow outwardly of the radially outer end, or tip, of the blade. To minimize the amount of gas escaping between the tip of a rotor blade and the shroud, the operating clearance between the tip of the rotor blade and the shroud should be as small as is practical. Generally the length of the blade is selected such that the radially outer end, or tip, of the blade is disposed close enough to the inner surface of the shroud so as to form a seal therebetween. One of the problems encountered with such engines is that rubbing contact inevitably occurs between the blade tip and the shroud. The main cause of such rubbing is difference in thermal expansion and/or contraction between the turbine and the shroud. The immediate problem caused by the rubbing is that the blade and the shroud wear away resulting in eventual loss of efficiency. The far reaching effect is that the protective coating at the tip of the blade is worn away exposing more of the base metal to the corrosive gases and more rapid deterioration of the blade tip will occur.

Some users may want to burn low grade ashforming fuels which contain high amounts of corrosive elements. Price, availability, and flexibility of fuel supply requires the consideration of crude and residual oil for future industrial gas turbine installations. Other fuels such as low Btu gas from enhanced oil recovery, fire flood operations or other industrial processes are available. Marine operations, for example, occasionally inadvertently contaminate fuel with sea water. These criteria have led turbine manufacturers to develop technologies for successful gas turbine operation on such low grade or "dirty" fuels.

One of the major concerns in using lower grade fuels is the corrosion caused by various mineral elements contained in these fuels. Corrosion rates rapidly increase at metal temperatures above 650° C. The temperature at the exposed turbine tip exceeds this temperature. Thus, actions must be taken to overcome the corrosion problems which erode the outer portion of turbine blades and the inwardly facing surface of shrouds affixed about the turbine blades.

The use of a coating of material on the radially outer edges of a blade tip has been suggested as a way of protecting the tip from the gases. However, due to the physical characteristics of present day coatings such coatings normally have a thickness of between 5 and 30 mils and will eventually be worn away. Since each such rub wears away some of the material, the radially thicker the coating, the more rubs it will withstand before it is completely worn away. If the coating is not of sufficient thickness to withstand these rubs the base blade material is exposed to the corrosive gases and rapid corrosion will occur. However, there is a maximum usable thickness limitation of the coating due to the lack of structural rigidity of the coating compared to the relatively high structural rigidity of the remainder of the tip. That is, if the coating was too thick radially, relative to the radial length of the blade, one rub could cause the entire coating of material to break off. Another problem resulting from the wearing away of the blade tip results in a greater gap of space between the blade and the shroud. The effects of this problem will be explained later. When the coating is provided on a superalloy turbine blade tip, the method of application must be metallurgically compatible with the superalloy substrate so that the properties of the substrate are not degraded. Such considerations place restraints on the kinds of coatings and processing techniques which are useful in the fabrication of such coatings.

Furthermore, structural integrity of the blades are absolutely essential due to the high centrifugal stresses and elevated temperatures to which the blades are exposed during high-speed rotation under normal operating conditions.

Examples of the above structures are described in the following patents: U.S. Pat. No. 4,390,320 issued to James E. Eiswerth on June 28, 1983, U.S. Pat. No. 4,689,242 issued to Roscoe A. Pike on Aug. 25, 1987, U.S. Pat. No. 4,589,823 issued to William K. Koffel on May 20, 1986, and U.S. Pat. No. 4,610,698 issued to Harry E. Eaton, et al on Sept. 9, 1986.

Other attempts to resist corrosion of the blade tip have resulted in various combinations of blade tips. For example, U.S. Pat. No. 4,232,995 issued to Kenneth W. Stalker, et al an Nov. 11, 1980, discloses an inner and outer tip portion bonded to a metallic projection body and the inner tip portion respectively. The inner tip is diffusion bonded to the body.

An example of rebuilding a portion of a blade disclosed in U.S. Pat. No. 3,574,924 issued to Gordon L. Dibble on Apr. 13, 1971. In that rebuilding process the damaged area of the blade is trimmed off and replaced with a precisely correspondingly sized replacement portion. The replacement portion is diffusion bonded in a mold to exactly duplicate the contour of the original blade. Another method for repairing blade tips is disclosed in U.S. Pat. No. 4,214,355 issued to John W. Zelahy on July 29, 1980. A first member is bonded to the side walls of a hollow body and a second member is bonded to the first member. Both members are diffusion bonded to the side walls and each other.

The coating patents listed above fail to provide a satisfactory tip on the blade which will withstand a multitude of rubs. The physical characteristics of todays coatings prevent the functional use of a thickness which will withstand a multitude of rubs which occurs with todays engines. The internal bond of todays coatings will allow the material to shear or break off from the blade body. Thus, heretofore a coating having a thickness greater than between 5 and 30 mils is not workable.

In todays applications attempts to increase turbine blade and shroud assembly resistance to high temperature, oxidation, corrosion and sulfidation have failed to consider that rubs are inevitable and that they must compensate for the affect that they have on the blade tip and shroud assembly.

The continued requirement by industry for use of dirty fuels has caused attempts to minimize the affects of these fuels on the turbine components. For example, the coating patents and the replacement portion or new portion patents listed above employ a diffusion bonding technique which uses heat and pressure to achieve the atomic bond therebetween. Furthermore, the disclosures in such above-mentioned patents do not consider the length required of a tip portion to insure a quantity of material resistant to oxidation and sulfidation that will remain after a multitude of rubs have occurred.

The greater the gap or spacing between the blades and the shroud the lower the efficiency of the engine. Thus, it is essential to provide as small a gap as is practical to insure maximum efficiency of the engine. In the art as shown above, as the blades wear the gap becomes greater and the efficiency is decreased. Therefor, it is desirable to prevent wear of the blades.

The present invention is directed to overcome one or more of the problems as set forth above.

DISCLOSURE OF THE INVENTION

In one aspect of the present invention an axial flow turbine for use with a gas turbine engine is disclosed. The engine includes a rotatable turbine wheel having an annular array of turbine blades attached thereto, a shroud assembly which has a radially inwardly facing surface positioned adjacent and radially outwardly of the turbine blades, and a coating affixed to the surface. The coating is resistant to high temperature, oxidation, corrosion and sulfidation and is rub-tolerant. Each of the blades has a metallic body of a predetermined strength sufficient to resist structural deformation at normal operating parameters of the engine and an outer tip is attached to the body and positioned adjacent the coating. The outer tip is comprised of a material which has a predetermined strength less than that of the body yet sufficient to prevent breakage thereof and separation from the metallic body during rubbing contact between the tip and the coating. The material composition of the outer tip is resistant to high temperature, oxidation, corrosion, sulfidation and thermal fatigue at normal operating parameters of the engine. The outer tip is formed on the metallic body by a weld layered puddling build-up using a filler rod having the material as an ingredient thereof.

In another aspect of the invention a method of making a turbine blade having a metallic body of a predetermined strength to resist structural deformation and an outer tip formed on the metallic body. The method comprises the following steps. Forming the outer tip on an outer extremity of the metallic body by a weld layered puddling build-up using a filler rod comprised of a material having a predetermined strength less than that of the body and being resistant to high temperature, oxidation, corrosion, sulfidation and thermal fatigue at operation temperatures. Machining the outer tip to a preestablished profile after forming of the outer tip on the metallic body.

In another aspect of the present invention a method of repairing a turbine blade comprises the following steps. Removing material from a metallic body the material being removed forming an outer extremity of the metallic body. Forming the outer tip on an outer extremity of the metallic body by a weld layered puddling build-up using a filler rod comprised of a material having a predetermined strength less than that of the body and being resistant to high temperature, oxidation, corrosion, sulfidation and thermal fatigue at operating temperatures. Machining the outer tip to a preestablished profile after forming of the outer tip on the metallic body.

BRIEF DESCRIPTION OF THE DRAWINGS

FIG. 2 is an enlarged sectional view of the turbine tip clearance area encircled by line II of FIG. 1.

FIG. 3 is an enlarged sectional view taken along line III—III of FIG. 2.

BEST MODE FOR CARRYING OUT THE INVENTION

Figure 1:
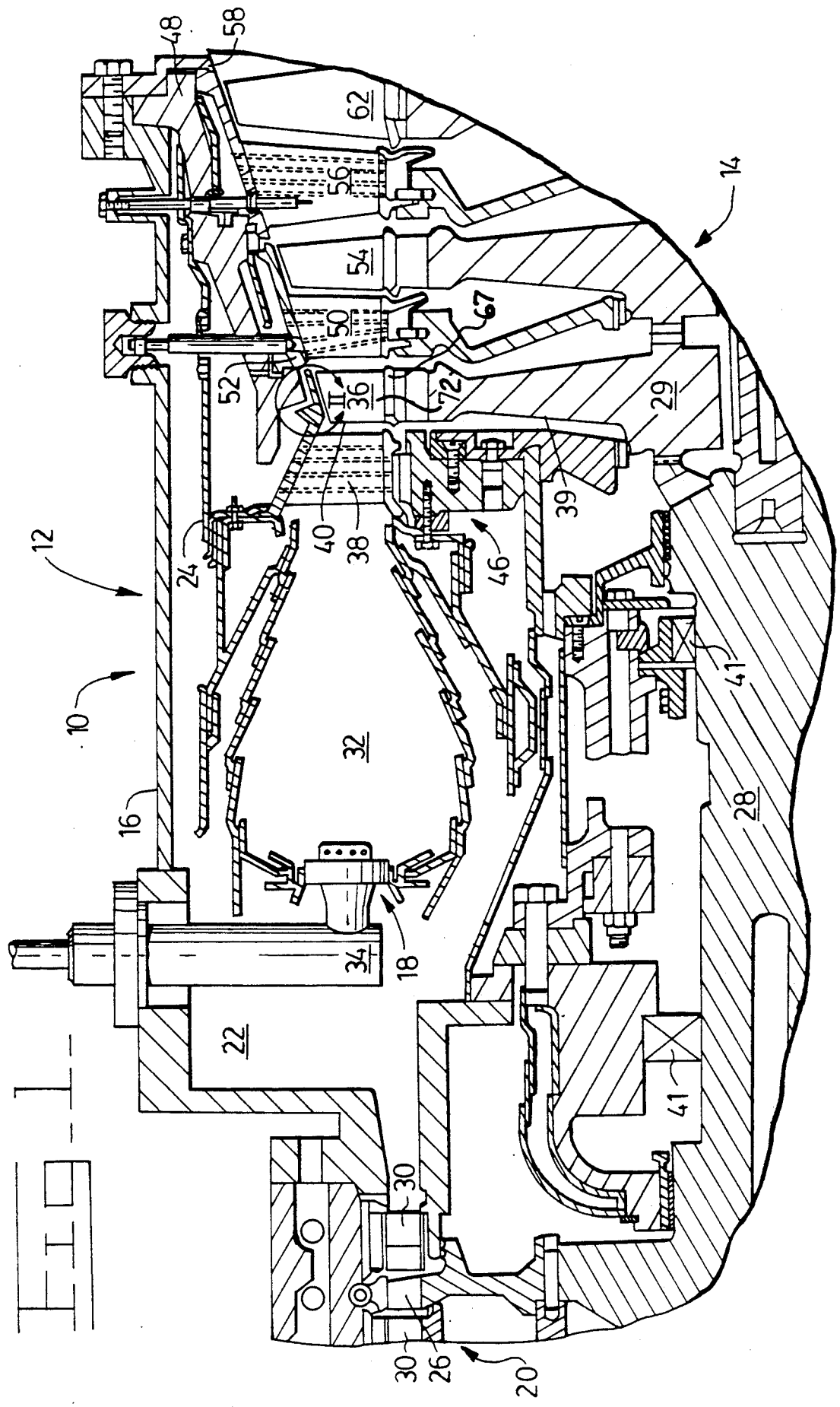
FIG. 1 is a partial sectional side view of a gas turbine engine disclosing the turbine blade tip control system of this invention.

Referring to FIG. 1, a gas turbine engine 10, not shown in its entirety, has been sectioned to show a turbine tip control system 12 for controlling internal leakage of a turbine section 14 of the engine. The engine 10 includes an outer case 16, a combustor section 18, a compressor section 20 and a compressor discharge plenum 22 fluidly connected to the compressor section 20. The plenum 22 is partially defined by the outer case 16 and a multipiece inner wall 24 partially surrounding the turbine section 14 and the combustor section 18. The compressor section 20 includes a plurality of rotatable blades 26 attached to a longitudinally extending center shaft 28 driven by a gasifier turbine section 29. A plurality of compressor stator blades 30 extend from the outer case 16 and are positioned between the rotatable blades. For illustration convenience, only a single stage of a multistage axial compressor 20 is shown. The combustor section 18 includes a combustion chamber 32 positioned in the plenum 22 and a plurality of fuel nozzles 34 (one shown) positioned in the chamber 32 at the end near the compressor section 20. The turbine section includes a first stage turbine 36 disposed partially within an integral first stage nozzle and shroud assembly 38. The first stage turbine 36 includes a rotatable turbine wheel 39 and an annular array of turbine blades 40 (one shown) attached thereto. The assembly 38 is attached to the inner wall 24 and supported from the center shaft 28 by a bearing arrangement 41 and a series of thermally varied masses 46 which are assembled to prevent rapid thermal variation during heating and cooling of such masses 46. A nozzle support case 48 is disposed within the outer case 16 and is attached to the case 16 by a plurality of bolts and dowels not shown. An integral second stage nozzle and shroud assembly 50 is attached to the nozzle support case 48 by a plurality of nozzle hooks 52 and a second stage turbine 54 is disposed partially within the assembly 50. An integral third stage nozzle and shroud assembly 56 is attached to the nozzle support case 48 by a plurality of nozzle hooks 58 and a third stage turbine 62 is disposed partially within the assembly 56. All the turbines 36, 54, 62 are connected to the longitudinally extending center shaft 28.

As more clearly shown in FIG. 2, the shroud assembly 38 has a radially inwardly facing surface 64 positioned adjacent and radially outwardly of the turbine blade 40. A coating 66 is affixed to the surface 64 and is resistant to high temperature, oxidation, corrosion and sulfidation and is rub-tolerant. Rub-tolerant means that the coating will separate from itself in fine particle form or smear when rubbed by the blades rather than to break in larger pieces. The rub-tolerant coating is applied by a plasma spray process and has a thickness of approximately 0.7 mm. The coating is comprised of cobalt, nickel, chromium and aluminum. The coating has the physical characteristics and is applied in a process to result in a uniform, continuous surface free from spalling, cracking, chipping or flaking.

Each of the turbine blades 40 has an attaching base 67 connected to the turbine wheel 39 and a blade portion 68 attached to the base 67. The blade portion includes a metallic body 69 attached to the base 67 and an outer tip 70 formed outwardly on the body. The outer tip 70 has an outer face 71 thereon opposite the end formed on the body 69. The metallic body 69 has a root area 72 near the base 67, an outer extremity 73 outwardly of the root area 72 and a perimeter 74 around the body. The body 69 is of a material which has a predetermined strength sufficient to resist structural deformation at normal operating parameters of the engine 10. The outer extremity 73 is positioned adjacent the coating 66 to provide a normal operating clearance therebetween. The outer tip 70 can be formed to include a flat tip portion, not shown, or a squealer tip portion 76. The squealer tip portion 76 provides a better seal between the blade 40 and the coating 66 than does a flat tip portion. The squealer tip portion 76 is formed to have a ridge 78 positioned at and around the perimeter 74 of the metallic body 69 and a concave portion 80 is formed in the center of the ridge 78. The ridge 78 of the squealer tip portion 76 has a tip extremity 82 and a bottom portion 84. As best shown in FIG. 3 the thickness of the ridge 78 is of a thinner cross-sectional area near the tip extremity 82 than is the thickness of a cross-sectional area of the ridge 78 near the bottom portion 84 resulting in the squealer tip portion 76 including a tapered build-up being thinner near the tip extremity 82 than near the bottom portion 84 of the squealer tip portion 76. The above structure is a result of the welding process since the layered build-up results in a narrower pass per respective build-up pass or series of repetitive passes. Thus, the squealer tip portion 76 is approximately 50% shorter than a conventional squealer tip configuration shown by phantom line 86. The outer tip 70 is comprised of a material which has a predetermined strength less than that of the body 69 yet has sufficient strength to prevent breaking and/or separating from the metallic body 69 during hard rubbing contacts between the blade 40 and the coating 66 and/or the shroud 38. Thus, the outer tip 70 must have sufficient length to accept the wearing away of a portion of the material and yet not be totally removed from protecting the metallic body 69 from oxidation, sulfidation and corrosion. For example, the metallic body 69 has a tensile strength of approximately 1080 kPa at room temperature and approximately 750 kPa at 870° C. and a yield strength of approximately 930 kPa at room temperature and approximately 650 kPa at 870° C. The outer tip 70 has a tensile strength of approximately 870 kPa at room temperature and approximately 380 kPa at 870° C. and a yield strength of approximately 380 kPa at room temperature and approximately 230 kPa at 870° C. Furthermore, the outer tip 70 is made of a nickel base material and is selected to include approximately 20%-24% chromium, 13%-15% tungsten, 1%-3% molybdenum and a trace of boron, lanthanum, silicon and manganese. A weld layered puddling build-up process is used to form the outer tip 70 on the metallic body 69. The process uses a filler rod having the nickel base material as described above as an ingredient thereof.

As best shown in FIG. 3, the outer tip 70 has a radial length "L" sufficient to insure protection of the metallic body 69 from the corrosive gases at the highest operating temperature even after a plurality of rubs occur between the blade 40 and the coating 66 and/or the shroud 38. Thus, the length of the outer tip 70 is at least 1 mm to insure that if a portion of the tip 70 is worn away during the rubbing of the blade 40 and the coating 66 and/or shroud 38 a portion of the material remains on the metallic body 69.

INDUSTRIAL APPLICABILITY

The turbine tip control system 12 of the present invention is part of a gas turbine engine 10. The compressor section 20 provides combustion air for the engine 10. The air is mixed with fuel from the fuel nozzles 34 in the combustion chamber 32. The mixture of fuel and air is combusted and the resulting gas expands and is used to drive the turbines 36, 54, 62 The gas is directed into the first stage turbine 36 through the first stage nozzle-and shroud assembly 38. The nozzle guides the gas so that it strikes the blades 40 at a preestablished angle to exert a maximum force,for rotating the turbine 36. Any leakage between the turbine blades 40 and the shroud assembly 38 results in reduced power and a loss of efficiency. Thus, the tightness or clearance between the outer extremity 73 of the turbine blade 40 and the shroud assembly 38 controls efficiency. For example, the clearance between the turbine 36, 54, 62 and the shroud assembly 38, 50, 56 in a typical application is approximately 0.5 mm.

The coating 66 minimizes the affects of corrosion, oxidation and sulfidation on the turbine components caused by burning low grade fuels. The primary function of the coating is to prevent damage/wear of the blade tips by "sacrificing" itself locally wherever rubs occur. Thus, the tip of the blade is not worn away during normal rubs and the efficiency of the engine remains high since the clearance between the blade 40 and the coating 66 becomes greater at point of the rub rather than along the entire radius of the rotating blade 40. The coating has the ability to accept rubs without breaking The rubs will result in the coating being displaced or ground away in a granular form, rather than in pieces or chunks which could cause further damage to the engine. It is desirable that the coating be displaced or ground away rather than allowed to build-up on one surface or the other since the build-up would lead to even heavier rubs.

The turbine blade 40 has been made of at least two different materials to overcome the high temperature, oxidation, corrosion and sulfidation problems. The metallic body 69 has a predetermined strength to resist the operating parameters of the engine. The engine of this embodiment operates up to about 12,000 rpm which converts to a linear speed of approximately 475 m/s at the outer extremity 73 of the turbine blade 40 and has a normal operating temperature range of between about 760° C. to 930° C. Due to the mass of the blade, heat of the expanded gas and the centrifugal force resulting from the high speed of rotation, these strengths as mentioned earlier are required to insure proper operation of the turbine blade 40. Stresses induced by temperature and speed are most severe about the root area 72 of the turbine blade 40. For example, the greater mass near the root area 72 absorbs and stores more heat than the mass of the blade near the outer tip 70. Thus, the metallic body 69 is made of a material having high strength but is more susceptible to corrosion and oxidation. The outer tip 69 has a lower mass resulting in less heat absorption and lesser centrifugal force which provides an opportunity to use a material having lesser strength. Thus, the outer tip 70 of the blade which is less susceptible to these extreme loads is made of a material having lower strength but being more resistant to corrosion, sulfidation and oxidation. For example, the material used in this application has a predetermined strength less than that of the metallic body 69. The length of the outer tip 70 is of a sufficient length to insure that a portion of the material remains on the metallic body even after hard rubs occur. For example, the engine 10 is stopped, the shroud assembly 38, 50, 56 has cooled down, the turbine 36, 54, 62 has remained hot and the engine 10 is restarted. Thus, the shroud assembly 38, 50, 56 is at a relative small diameter due to thermal contraction and the turbine 36, 54, 62 is at a relative large diameter due to the retention of heat and thermal expansion resulting in maximum interference or a hard rub between the blade 40 and the coating 66 and/or shroud 38. The outer tip 70 is formed on the metallic body 69 by a weld layered puddling build-up using a filler rod having the nickel base material as the main ingredient thereof. After welding, the turbine blade 40 is finish machined by a grinding process to blend the welded material or outer tip 70 to match the airfoil contour of the metallic body 69 so that the surfaces blend in a smooth and continuous manner around the profile of the blade tip area. The concave portion 80 of the squealer tip portion 76 remains as welded. The squealer tip portion 76 although being shorter than that of a conventional squealer tip portion will provide a better seal than that of the flat tip portion. The shorter squealer tip portion 76 as compared to a conventional squealer tip configuration 86 has little affect on the sealing between the blade 40 and the coating 66 and/or shroud 38. Although the unmachined concave portion 80 adds imbalance to the blade, the shorter height of the squealer tip portion helps to reduce the amount of imbalance created by the forming process. Turbine blades 40 which are not going to be coated are heat treated in a conventional manner.

When repairing a turbine blade 40 which has a protective coating resistant to oxidation and sulfidation applied to the entire blade, the coating must be removed or stripped away before repair can begin. Material is removed at the outer end of the metallic body 69 by machining, such as grinding. The quantity of material which was removed will be replaced by a welding build-up process as discussed above. The blending operation is preformed as discussed above. At this time, for blades which are to be coated by a conventional process do not require a separate heat treating process since the coating process requires that the coating be cured in an inert atmosphere at approximately 760° for 4 hours and the separate heat treating process is not required. The entire blade is normally coated due to economics but only the metallic body 69 needs to be coated to resist oxidation, corrosion and sulfidation.

Other aspects, objects and advantages will become apparent from a study of the specification, drawings and appended claims.

We claims:

1. A method of making a turbine blade having a metallic body being of a predetermined strength sufficient to resist structural deformation and an outer tip formed on the metallic body comprising the steps of:
   (a) forming the outer tip on an outer extremity of the metallic body by a weld layered puddling build-up of a repetitive series of passes using a filler rod comprised of a material having a predetermined strength less than that of the metallic body and being resistant to high temperature, oxidation, corrosion, sulfidation and thermal fatigue at operating temperatures; and
   (b) machining the outer tip to a preestablished profile after forming of the outer tip on the metallic body.

2. The method of making a turbine blade of claim 1 wherein the step of forming the outer tip to the outer extremity of the metallic body by the weld layered puddling build-up includes forming a squealer tip portion.

3. The method of making a turbine blade of claim 2 wherein the step of forming the outer tip to the outer extremity of the metallic body by the weld layered puddling build-up includes forming a squealer tip portion approximately 50 percent of the length of a conventional squealer tip configuration.

4. The method of making a turbine blade of claim 1 wherein the step of machining the outer tip to a preestablished contour includes a grinding process.

5. The method of making a turbine blade of claim 1 wherein the method further includes a heat treating process of the blade.

6. The method of making a turbine blade of claim 1 the method further includes a coating process on at least the metallic body of the blade.

7. The method of making a turbine blade of claim 6 wherein the coating process further includes a heat treating process.

8. The method of making a turbine blade of claim 7 wherein the step of heat treating includes heat treating in an inert atmosphere at approximately 760° C. for 4 hours.

9. A method of repairing a turbine blade comprising the steps of:
   (a) removing material from a metallic body said removing of material resulting in an outer extremity being formed on the metallic body;
   (b) forming an outer tip on the outer extremity of the metallic body by a weld layered puddling build-up of a repetitive series of passes using a filler rod comprised of a material having a predetermined strength less than that of the body and being resistant to high temperature, oxidation, corrosion, sulfidation and thermal fatigue at operating temperatures; and
   (c) machining the outer tip to a preestablished profile after forming or the outer tip on the metallic body.

10. The method of repairing a turbine blade of claim 9 wherein the step of removing material includes stripping a coating from the blade.

11. The method of repairing a turbine blade of claim 9 wherein the step of forming the outer tip to the outer extremity of the metallic body by the weld layered puddling build-up includes forming a squealer tip portion.

12. The method of repairing a turbine blade of claim 9 wherein the step of forming the outer tip to the outer extremity of the metallic body by the weld layered puddling build-up includes forming a squealer tip portion having a height being approximately 50 percent that of a conventional squealer tip configuration.

13. The method of repairing a turbine blade of claim 9 wherein the step of machining the outer tip to a preestablished contour includes a grinding process.

14. The method of repairing a turbine blade of claim 9 the method further includes a heat treating process of the blade.

15. The method of repairing a turbine blade of claim 9 wherein the method further includes a coating process on at least the metallic body of the blade.

16. The method of repairing a turbine blade of claim 15 wherein the coating process further includes a heat treating process.

17. The method of repairing a turbine blade of claim 16 wherein the coating process includes a process in which the blade is cured in an inert atmosphere at approximately 760° C. for 4 hours.

* * * * *

UNITED STATES PATENT AND TRADEMARK OFFICE
CERTIFICATE OF CORRECTION

PATENT NO. : 5,048,183
DATED : September 17, 1991
INVENTOR(S) : John N. Cang et al.

It is certified that error appears in the above-identified patent and that said Letters Patent is hereby corrected as shown below:

Claim 14, Column 10, line 2, insert --wherein-- after "9".

Signed and Sealed this

Thirtieth Day of March, 1993

Attest:

STEPHEN G. KUNIN

Attesting Officer

Acting Commissioner of Patents and Trademarks